Nov. 18, 1947.  C. H. JACOBSON  2,431,254
FILM FEEDING AND CONTROLLING MEANS
Filed Dec. 20, 1946
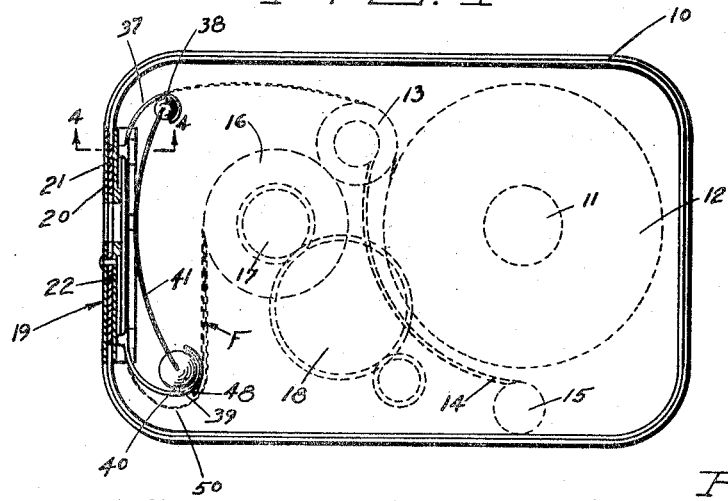
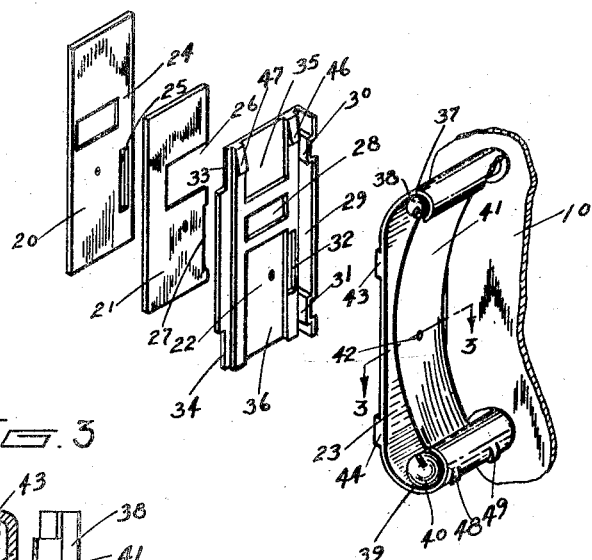
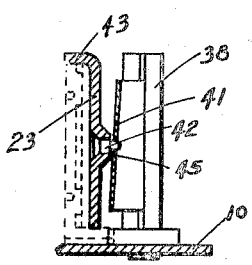
INVENTOR.
CARL H. JACOBSON
ATTORNEYS Patented Nov. 18, 1947

2,431,254

UNITED STATES PATENT OFFICE 2,431,254

FILM FEEDING AND CONTROLLING MEANS

Carl H. Jacobson, Binghamton, N. Y., assignor to General Aniline & Film Corporation, New York, N. Y., a corporation of Delaware Application December 20, 1946, Serial No. 717,407

6 Claims. (Cl. 88—17)

This application pertains to an invention in film feeding and controlling means for moving picture apparatus such as moving picture cameras and projectors. More specifically, the invention pertains to film control between the supply and a film gate at which exposures are effected and between that gate and a take-up for the exposed film.

Among the objects of the invention is that of providing simple means by which the film after having been advanced the requisite distance between frames prior to exposure, is automatically maintained in correct lateral position and also is prevented from slipping backwardly upon disengagement of the film advancing claw, or forwardly toward the film take-up.

Other objects of the invention will be apparent as the disclosure progresses.

While the invention is applicable to all types of moving picture apparatus to which it may be applied, it is especially adapted to use in film magazines such as those for amateur type cameras of 8 mm. and 16 mm. sizes, and for convenience, the invention will be described as applied to such a magazine, but is by no means limited thereto.

Film, such as the usual 16 mm. or 8 mm. film, is commonly supplied in magazines for amateur moving picture cameras and in those magazines it is frequent practice to provide a gate and other mechanism incidental to the advancing, exposure, and take-up of the film. The invention is not limited to any particular type or size of moving picture film. In fact, the principles of the invention are applicable to film feeding and take-up mechanism for cameras, projectors and the like, and apply to such devices when a part of cameras or projectors in which there is no magazine or other film enclosing means beyond that provided by the camera casing itself.

The general construction of the film gate may be rather widely varied so long as there are provided according to the invention, certain detents or other means hereinafter to be described in greater detail, and which engage the perforations at the edges of the film in a manner to prevent backwinding thereof or to prevent any slight movement of the film in a direction reverse to its normal travel after movement and upon release by the usual film advancing claw.

In accordance with the invention and in addition to the details above mentioned, a film guiding means preferably curved to permit the film to pass from the gate and to be drawn toward the take-up spool has a similar detent or detents engageable with the perforations at the edges of the film to hold it from creeping or otherwise moving forwardly in the direction of the take-up spool, as is likely to happen in the event the gate pressure does not serve effectively to brake the film against the constant tendency of the take-up to draw it onwardly through the gate.

In addition to the above-mentioned controls which function to prevent either forward or backward movement of the film during exposure, the gate pressure spring is so formed and so disposed as to hold the pressure plate against the front gate plate and to urge it in such direction that a lateral film guiding means at one edge thereof is always maintained resiliently against the corresponding edge of the said front gate plate.

The detents which prevent back movement of the film offer no serious resistance against moving the film forward between each separate frame. Those detents directed in the reverse direction and which prevent undesired forward movement of the film do not release the film until after an appreciable length of film has been drawn by the pull-down claw which incidentally functions to draw film at a more rapid rate than the take-up mechanism is designed to wind a corresponding length thereof. That results in formation of a free loop at the lower side of the guiding means beneath the gate and automatically disengages the film perforations from those detents by means of which they were positively engaged during the rest or exposure period. Once released, the film by its natural tendency to form a larger loop and the fact there is some immediate take-up action, makes it impossible for the detents to again engage those same perforations upon further take-up action. After completion of the pull-down action to advance the next succeeding frame, the take-up in performing its function does engage the next following perforations upon the detents. The action as above outlined and as will be more thoroughly explained in following paragraphs continues in repeated cycles during the exposure of any desired length of film.

The invention will be described in greater detail by reference to one preferred form thereof as illustrated in the accompanying figures of drawing, in which:

Fig. 1 shows the invention applied to a film magazine.

Fig. 2 is an exploded view of the gate for the magazine of Fig. 1.

Fig. 3 is a section taken at line 3—3, Fig. 2.
Fig. 4 is a section taken at line 4—4, Fig. 1.

Referring to Fig. 1, the invention has been applied to a film magazine having a casing 10, a supply core 11 on which is provided the usual supply roll of film 12 which, as herein illustrated, runs over a frictionally driven roller 13 rotatable on an arm 14 pivoted at 15, and spring pressed against the outer surface of a take-up roll of film 16 on take-up core 17. The take-up core 17 is driven in the usual manner by means of gearing generally indicated by numeral 18 and which is more or less conventional and need not be further shown or described here. It is to be understood that the take-up drive between the reel 17 and the last positively rotated element in the drive train is of such resilient nature that it slips thereby to compensate for speed differences and to prevent undue strain on the film, but which nevertheless will advance the core at a speed suitable for taking up all exposed film. Of course, the speed at which the take-up core rotates upon starting exposure of a length of film is greater than that permitted later as the amount of film increases on the core, thereby increasing the effective diameter thereof.

A gate generally indicated by numeral 19 is shown in more detail in the exploded view, Fig. 2. That gate includes a front plate 20, a spacer 21, an aperture plate 22, and the rear member or pressure plate 23. The front plate 20 has the usual aperture 24 through which light is admitted and a slot 25 through which the claw engages the perforations at one edge of the film. The intermediate spacer 21 is cut away at 26 and also at 27 to provide for the admission of light and for the claw as the same projects through slot 25. Then the aperture plate 22 is provided with a gate opening or aperture 28, a side member or flange 29 having lateral edge guiding projections 30 and 31, a slot 32 for the claw and indentations 33 and 34 for a purpose later to be described. The aperture plate is further recessed at 35 and at 36 to eliminate all unnecessary contact with the picture area or image portion of the film. The plates 20, 21, and 24 are secured together by a rivet or other appropriate means and, as shown in Fig. 1, form a more or less unitary and permanent portion of the front part of the magazine casing 10.

The pressure plate 23 is extended and curved at its upper end as at 34 and hooks about a stud 38 projecting from the side of casing 10. That plate has a similarly curved film guiding extension 39 which likewise hooks about a stud 40 and it is to be understood that the hooked portions 37 and 39 normally engage their respective studs 38 and 40 loosely or with sufficient clearance so that a spring 41 bearing against a pin or stud 42 attached to the plate 23 will always push the plate forwardly against the film which in turn is guided against the complementary surfaces at aperture plate 22. The spring 41 is engaged at either end within slots in the studs 38 and 40 so that while the plate is free to move throughout a limited extent, it is confined to substantially the position it occupies in Fig. 1 and is pressed forwardly against the back of the film with a normal amount of pressure adapted to maintain the film flatly at the focal plane.

The pressure plate 23 also carries at the edge thereof bent lugs 43 and 44 which engage within the indentations 33 and 34, above mentioned. These lugs 43 and 44 serve as edge guides for the opposite edge of the film to that which engages or is guided by the parts 30 or 31. The plate 23, as more clearly shown in Fig. 3, is so connected to spring 41 by the pin 42 and a wedge-shaped washer or spacer 45 that the spring 41 is twisted or distorted as illustrated. That assures that the lugs 43 and 44 are always urged in a direction to bear against the corresponding or cooperating surfaces of the plate 22 at the indentations 33 and 34.

At the part of the pressure plate 23 which is adjacent the aperture 28, the plate is so formed as to present a complete and flat backing for the film. At other parts thereof, the plate is relieved or is offset as shown at Fig. 4 so that the film is contacted only at its edges or beyond the part thereof which is exposed and upon which the final image is to be seen.

The aperture plate has formed thereon, during molding or other fabrication thereof, or by attachment of separate parts, a pair of film engaging detents 46 and 47. These detents are of such size that they engage the perforations at the edges of the film and, as shown, will prevent that film from being drawn or otherwise moved backwardly toward the supply. The detents offer practically no resistance to forward movement of the film which slides over them as the pressure plate 23 is pushed backwardly a very slight extent. Alternatively, the detents may be relatively thin and flexible so that they flex away from the film and into a cooperating indentation in the plate.

The curved part 39 of the plate 23 which is preferably curved to a larger radius than the part 37, has a similar pair of detents 48 and 49 which are directed in the opposite direction from those at the top of the plate 22. These detents 48 and 49 engage the film perforations after the film has been exposed and has passed through the gate upon its way to be taken up on the core 17. The tendency of the take-up mechanism is to draw the film indicated at F tightly about the curved film guiding gate extension 39 and in so doing it will draw that film so that the detents engage perforations and prevent any further movement at that time. Since the pull by the take-up comes in a direction more or less at right angles to the backward movement of the plate 23 and upwardly against the rigid stud 40, there is no possibility of the take-up action causing the film to slip through the gate as is possible with mechanisms otherwise constructed and in film handling apparatus in which there are provided no positive locking means for the film such as the well-known locking pins which sometimes function in cooperation with the claw movement.

Upon completing exposure of a frame, the shutter is closed and the claw quickly grips the film at its next perforation and rapidly pulls that film down to present another area thereof for exposure. That claw action is considerably faster than the advance of the take-up core at any time since the take-up reel has the possibility of winding the film at all times and the claw movement must be exceedingly rapid since it is actually idle for the greater part of a cycle. The fact that the claw movement draws film faster than the take-up winds it, makes it possible to disengage that film from the detents 48 and 49 as shown in Fig. 1. A loop 50 is momentarily formed and due to the tendency of the film to assume a larger radius than that which it takes when drawn tightly about the guiding member 39 moves it away from the detents whereupon action of the take-up will move the last-engaged perforations out of range of those detents. Further movement of the take-up retracts that temporary loop 50 and pulls the next following perforations into engagement with the detents 48 and 49, so that at exposure or at that time at which the shutter is opened and during at least a part of which the claw has become disengaged and is returning to start its cycle, the film is locked against forward movement and also against movement in a reverse direction. It is laterally guided by the lugs 43 and 44 and by the inwardly directed portions 30 and 31 of the aperture plate 22.

When in properly assembled relationship, as illustrated in Figs. 3 and 4, the distance between these lateral guiding elements is just sufficient for standard film of that size being handled to pass between without binding. A certain amount of tolerance is permitted with all types of film and, of course, the lateral guiding means may not bear at both sides at the same time. Lateral movement is positively restricted to a minimum and thus the alignment of the series of pictures taken is as nearly correct as is practicable with commercially obtainable film. There is no binding or unnecessary resistance to the progress of the film through the gate.

The extent of the claw movement, the position of the aperture, and the positioning of the detents 46 and 47 is such that those detents engage the film perforations just as the claw has moved that film throughout one full stroke. Likewise, the detents 48 and 49 are correctly positioned to engage the film perforations at the same time. A slight amount of tolerance must be provided and that tolerance is based upon permissible tolerances in manufacture of parts and the perforating of film. Such tolerances are slight so that if no further movement is permitted, the spacing of the independent frames is such as to give pictures of maximum steadiness upon projections, that being something heretofore not obtainable with most magazine loaded film or with other motion picture mechanisms where no locking pins or other devices for retaining the film in a precise relationship during each exposure have been provided.

While for film perforated at both edges pairs of detents are preferably employed, if the film is not so perforated, the detents are limited in number and position accordingly.

The invention has been described as it has been applied to one particular gate more adapted to a magazine than to a moving picture mechanism for employing the magazine. It is to be understood that the invention is equally applicable to other similar gates whether a part of a magazine or whether they constitute some portion of a motion picture apparatus such as a camera or projector with which no similar magazine is employed.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a motion picture mechanism, the combination of a film supply, a film take-up and an exposure gate between said supply and take-up through which the film is passed, said gate comprising an aperture plate and a pressure plate and film guiding means adjacent said pressure plate, and means for retaining the film in fixed position at said gate including a detent projecting from said aperture plate for engaging film perforations and being so directed as to prevent movement of the film toward the supply, and a second detent on that film guiding means between the gate and take-up for engagement with the film perforations so directed as to prevent movement of the film through the gate and toward the take-up, said last-mentioned detent being so disposed as to disengage its film perforation upon movement of the film through the gate for presenting each succeeding picture area thereof at the said gate aperture.

2. In a motion picture mechanism, the combination of a film supply, a film take-up and an exposure gate between said supply and take-up through which film is passed as it is exposed to produce a series of motion picture scenes, said gate comprising an aperture plate and a pressure plate and film guiding means adjacent said pressure plate, and means for retaining the film in fixed position during exposure including a detent projecting from said aperture plate for engaging film perforations and being so directed as to prevent movement of the film toward the supply, and a second detent on that film guiding means between the gate and take-up for engagement with the film perforations, so directed as to prevent movement of the film through the gate and toward the take-up, said last-mentioned detent being so disposed as to disengage its film perforation upon movement of the film through the gate for each succeeding frame.

3. In a motion picture mechanism, the combination of a film supply, a film take-up and an exposure gate between said supply and take-up through which the film is passed as it is exposed to produce a series of motion picture scenes, said gate comprising an aperture plate and a pressure plate and film guiding means adjacent said pressure plate, and means for retaining the film in fixed position during exposure including detents projecting from said aperture plate and disposed for engaging perforations at the sides of the film, said detents being so directed as to prevent movement of the film toward the supply, but permitting the film readily to slide over them toward the take-up side of the gate, and a second pair of detents on that film guiding means between the gate and take-up for engagement with the film perforations, said detents being so directed as to prevent movement of the film through the gate and toward the take-up, said last-mentioned detents being so disposed as to disengage the film perforations held thereby upon movement of the film through the gate prior to the exposure of each succeeding frame thereby to permit take-up of the slack film and to engage the next succeeding perforations.

4. In a motion picture mechanism, the combination of a film supply, a film take-up and an exposure gate between said supply and take-up through which the film is passed as it is exposed to produce a series of motion picture scenes, said gate comprising an aperture plate and a pressure plate and film guiding means adjacent said pressure plate including curved extensions from said plate, and means for retaining the film in fixed position during exposure including detents projecting from said aperture plate and disposed for engaging perforations at the sides of the film, said detents being so directed as to prevent movement of the film toward the supply, but inclined in a direction of the film travel for permitting the film perforations to be readily disengaged and the film to slide thereover when moved toward the take-up side of the gate, and a second pair of detents on that curved film guiding extension between the gate and take-up for engagement with the film perforations, said detents being similarly shaped but oppositely directed to those first mentioned thereby to prevent movement of the film through the gate and toward the take-up, said last-mentioned detents further being so disposed relatively to the film and to the take-up roll that, upon rapid movement of film through the gate prior to exposure of each succeeding frame, the perforations then held by said detents will be disengaged and upon further winding of film at the take-up, the next succeeding perforations will be engaged.

5. In a motion picture mechanism, the combination of a film supply, a film take-up and an exposure gate between said supply and take-up through which film is passed as it is exposed to a series of motion picture scenes, said gate comprising an aperture plate and a pressure plate and film guiding means adjacent said pressure plate, and means for retaining the film in fixed position during exposure including abutments at either side of said gate for preventing unintended lateral movement of the film, detents projecting from said aperture plate for engaging film perforations, said detents being so directed as to prevent movement of the film toward the supply, and a second pair of detents on that film guiding means between the gate and take-up for engagement with the film perforations, said detents being so positioned and so directed as to prevent movement of the film through the gate and toward the take-up, said last-mentioned detents further being so disposed as to disengage their film perforations upon rapid movement of the film through the gate for exposure of each succeeding frame.

6. Supply mechanism as defined in claim 5 in which the said abutments for preventing lateral movement of the film include projections at one side of the pressure plate and corresponding indentations in said aperture plate, and wherein resilient means provided for urging said pressure plate against the film at the aperture plate is so connected to the pressure plate that a component of force is applied to the pressure plate in a lateral direction to engage the said projections against the indentations in the aperture plate.

CARL H. JACOBSON.

REFERENCES CITED

The following references are of record in the file of this patent:

UNITED STATES PATENTS

| Number | Name | Date |
|---|---|---|
| 1,969,475 | Opperman | Aug. 7, 1934 |
| 2,231,665 | Fairbanks | Feb. 11, 1941 |
| 2,262,570 | Wittel | Nov. 11, 1941 |